United States Patent
Kosseifi et al.

(10) Patent No.: US 10,412,436 B2
(45) Date of Patent: Sep. 10, 2019

(54) DETERMINING VIEWERSHIP FOR PERSONALIZED DELIVERY OF TELEVISION CONTENT

(71) Applicant: AT&T Mobility II LLC, Atlanta, GA (US)

(72) Inventors: Mario Kosseifi, Roswell, GA (US); Joseph B. Thomas, Marietta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 138 days.

(21) Appl. No.: 14/485,558

(22) Filed: Sep. 12, 2014

(65) Prior Publication Data
US 2016/0080792 A1    Mar. 17, 2016

(51) Int. Cl.
*H04H 60/56* (2008.01)
*H04N 21/2668* (2011.01)
(Continued)

(52) U.S. Cl.
CPC ......... *H04N 21/2668* (2013.01); *G06Q 30/02* (2013.01); *H04N 21/00* (2013.01);
(Continued)

(58) Field of Classification Search
CPC .............. G06Q 30/02; G06Q 30/0261; G06Q 30/0269; G06Q 30/0251; G06Q 30/0271; H04N 21/812; H04N 21/25841; H04N 21/4532; H04N 21/43637; H04N 21/44218; H04N 21/25816; H04N 21/25875; H04N 21/4415; H04N 21/42201; H04N 21/4432; H04W 4/028; H04W 4/021; H04W 64/00; H04M 1/72572; H04L 67/18; H04L 67/22

See application file for complete search history.

(56) References Cited

U.S. PATENT DOCUMENTS 5,446,919 A    8/1995  Wilkins
8,046,797 B2   10/2011 Bentolila et al.
(Continued)

FOREIGN PATENT DOCUMENTS

WO      WO 0158098 A2 *   8/2001   ............... G01S 1/68
WO      WO 2002033626 A1    4/2002
(Continued)

OTHER PUBLICATIONS

Delagi, Greg, "Harnessing Technology to Advance the Next-Generation Mobile User-Experience", 2010 IEEE International Solid-State Circuits Conference (2000) (available at http://ieeexplore.ieee.org/stamp/stamp.jsp?arnumber=5434067, last visited Aug. 20, 2015).*
(Continued)

*Primary Examiner* — Jason P Salce

(57) ABSTRACT

Methods, computer-readable media and devices for presenting a personalized content to a viewer at a display are disclosed. For example, a method receives location information of a device of an individual, compares the location information to a location of the display and determines that the individual is the viewer when the location information indicates that the device of the individual is proximate to the display. The method then presents the personalized content to the viewer on the display when it is determined that the individual is the viewer.

17 Claims, 3 Drawing Sheets

(51) Int. Cl.

| | | |
|---|---|---|
| *H04N 21/25* | (2011.01) | |
| *H04N 21/258* | (2011.01) | |
| *H04N 21/4415* | (2011.01) | |
| *H04N 21/81* | (2011.01) | |
| *G06Q 30/02* | (2012.01) | |
| *H04N 21/00* | (2011.01) | |
| *H04N 21/414* | (2011.01) | |

(52) U.S. Cl.
CPC ..... *H04N 21/251* (2013.01); *H04N 21/25841* (2013.01); *H04N 21/25883* (2013.01); *H04N 21/41415* (2013.01); *H04N 21/4415* (2013.01); *H04N 21/812* (2013.01)

(56) References Cited

U.S. PATENT DOCUMENTS

| | | | |
|---|---|---|---|
| 8,204,073 B1 | 6/2012 | Gailloux | |
| 8,281,336 B2 | 10/2012 | Shkedi | |
| 8,489,459 B2 | 7/2013 | Vallier et al. | |
| 8,607,267 B2 | 12/2013 | Shkedi | |
| 8,627,359 B2 | 1/2014 | Kitts et al. | |
| 8,683,502 B2 | 3/2014 | Shkedi et al. | |
| 8,712,110 B2 | 4/2014 | Eckhoff et al. | |
| 8,726,312 B1 | 5/2014 | Hewinson | |
| 8,750,602 B2 | 6/2014 | Li et al. | |
| 8,751,634 B2 | 6/2014 | Julia et al. | |
| 8,751,636 B2 | 6/2014 | Tseng et al. | |
| 2002/0091568 A1* | 7/2002 | Kraft | G06Q 30/02 705/14.58 |
| 2004/0073482 A1 | 3/2004 | Wiggins et al. | |
| 2004/0210942 A1 | 10/2004 | Lemmons | |
| 2007/0288966 A1* | 12/2007 | Javid | H04N 7/17318 725/46 |
| 2009/0070797 A1* | 3/2009 | Ramaswamy | H04L 12/66 725/10 |
| 2009/0210902 A1 | 8/2009 | Slaney | |
| 2010/0228632 A1* | 9/2010 | Rodriguez | G06F 3/011 705/14.66 |
| 2011/0208586 A1 | 8/2011 | Joa et al. | |
| 2012/0167124 A1* | 6/2012 | Abdeljaoued | H04H 60/45 725/11 |
| 2012/0304208 A1 | 11/2012 | Mcwilliams | |
| 2013/0088650 A1* | 4/2013 | Rouady | H04N 21/4432 348/734 |
| 2013/0322706 A1* | 12/2013 | Hudgins | G06K 9/00 382/118 |
| 2014/0075463 A1 | 3/2014 | Kamdar | |
| 2014/0089956 A1 | 3/2014 | Shah et al. | |
| 2014/0129347 A1 | 5/2014 | Pradeep | |
| 2014/0143062 A1 | 5/2014 | Jones | |
| 2014/0149227 A1 | 5/2014 | Hoyle | |
| 2014/0156398 A1 | 6/2014 | Li et al. | |
| 2014/0157309 A1 | 6/2014 | Small et al. | |
| 2014/0188614 A1* | 7/2014 | Badenhop | H04L 67/20 705/14.58 |
| 2015/0208123 A1* | 7/2015 | Shintani | H04N 21/426 725/110 |
| 2015/0235055 A1* | 8/2015 | An | G06F 21/32 713/186 |
| 2016/0021412 A1* | 1/2016 | Zito, Jr. | H04N 21/251 725/13 |

FOREIGN PATENT DOCUMENTS

| | | |
|---|---|---|
| WO | WO 2007/057843 | 5/2007 |
| WO | WO 2011041054 A1 | 4/2011 |
| WO | WO 2012051594 A2 | 4/2012 |

OTHER PUBLICATIONS

Dillow, Clay, "IBM's Digital Billboard Displays Individualized Ads by Reading the RFID Data in Your Wallet", Popular Science, posted Aug. 2, 2010 (available at http://www.popsci.com/technology/article/2010-08/ibms-new-digital-billboard-tailors-individual-ads-rfid-data-your-credit-card, last visited Aug. 19, 2015).*

Gray, Richard, "Minority Report-style advertising billboards to target consumers", The Telegraph, Aug. 1, 2010 (available at http://www.telegraph.co.uk/technology/news/7920057/Minority-Report-style-advertising-billboards-to-target-consumers.html, last visited Aug. 19, 2015).*

"Gracenote rolling out a custom ad service for TV commercials", Dec. 26, 2012, pp. 1-5, http://www.ventruebeat.com/2012/12/26/gracenote-tv-commercials/.

"Insight: Intel's plans for virtual TV come into focus", Jun. 8, 2012, pp. 1-5, http://www.reuters.com/article/2012/06/08/is-intel-tv-idUSBRE85706Q20120608.

"Targeted TV ads Set for Takeoff", DirecTV, Dec. 20, 2010, pp. 1-4, http://online.wsj.com/news.articles/SB10001424052748704226504576029871779927478.

"Personalized TV ads coming to your living room", Cablevision, Mar. 2011, pp. 1-6, http:archive.chiagobreakingbusiness.com/2011/03/personized-tv-ads-coming-to-your-living-room.html.

"Comcast to target ads to individual subscribers watching linear programming", Nov. 8, 2013, pp. 1-3, http://www.fiercecable.com/comcast-target-ads-individual-subscribes-watching-linear-programming/2013-11-08.

PCT Search Report and Written Opinion of International application No. PCT/US2015/049658, dated Nov. 2, 2015. pp. 1-9.

* cited by examiner

DETERMINING VIEWERSHIP FOR PERSONALIZED DELIVERY OF TELEVISION CONTENT

The present disclosure relates generally to a subscription television service, and more particularly to devices and methods for delivering personalized television content based upon determined viewership.

BACKGROUND

Currently, television, radio and Internet advertising use a broad-approach marketing strategy where the aim is to cover as wide an area or population as possible with specific to general advertising. The specific advertising only affects a certain number of viewer/listeners while the other viewers/listeners are ambivalent since they do not need the product or service or are frustrated that the product or service may not even be available in their area. Similarly, general advertising is often deemed to be an inefficient method of advertising given the relatively small return as compared to the high cost of general advertising.

SUMMARY

In one embodiment, the present disclosure describes a method, computer-readable medium or device for presenting a personalized content to a viewer at a display. For example, the method receives location information of a device of an individual, compares the location information to a location of the display and determines that the individual is the viewer when the location information indicates that the device of the individual is proximate to the display. The method then presents the personalized content on the display when it is determined that the individual is the viewer.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
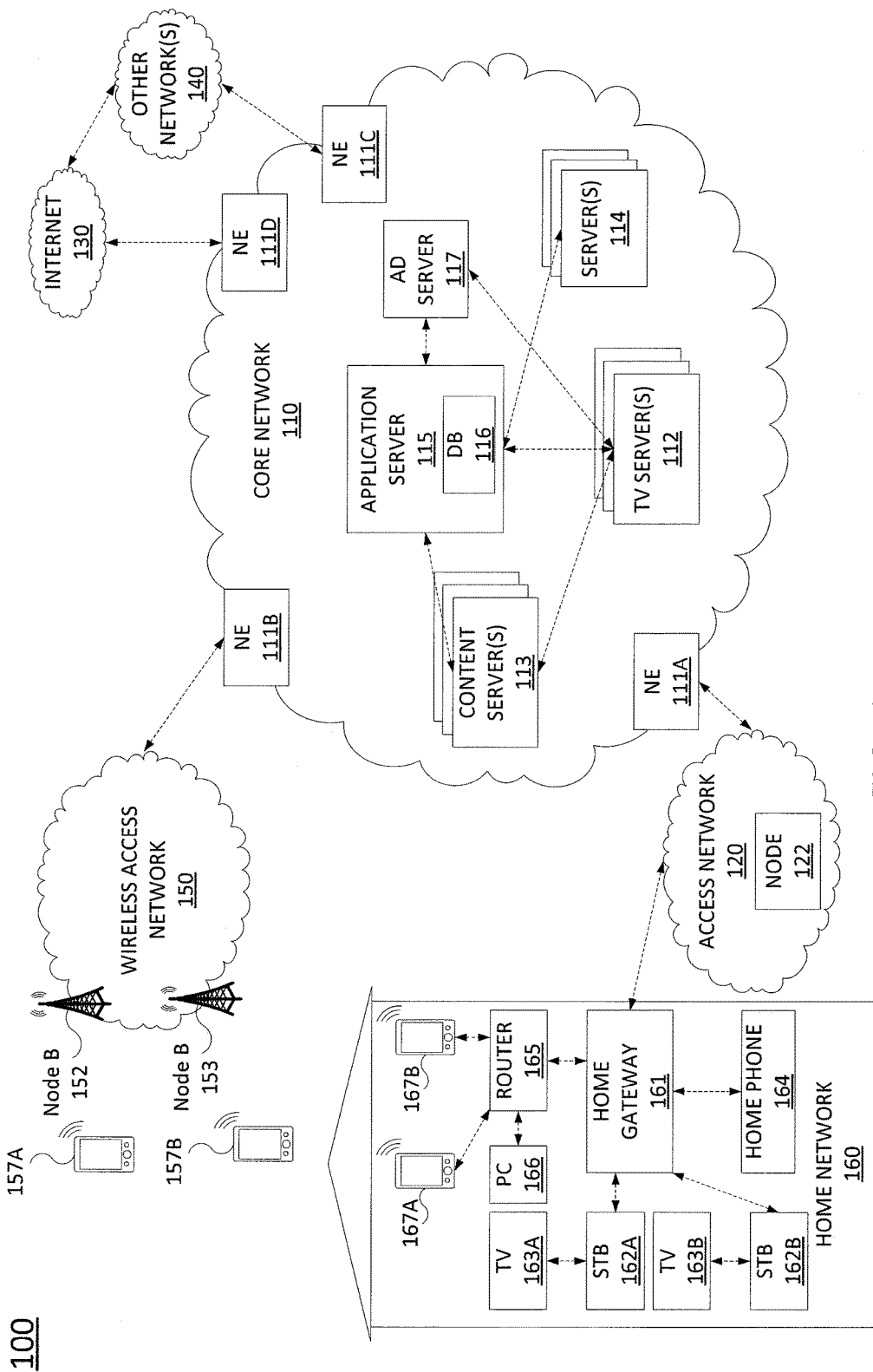
FIG. 1 illustrates an exemplary network related to the present disclosure.

To better understand the present disclosure, FIG. 1 illustrates an exemplary network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and 163B, home phone 164, router 165, personal computer (PC) 166, and so forth, with one another and with various other devices via a core network 110, a wireless access network 150 (e.g., a cellular network), an access network 120, other networks 140 and/or Internet 130.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one embodiment, each of mobile devices 157A, 157B, 167A, and 167B may comprise any subscriber/customer endpoint device configured for wireless communication such as a personal computer, a laptop computer, a Wi-Fi device, a Personal Digital Assistant (PDA), a mobile phone, a smartphone, a smart television, or smart TV, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP)) network. The network elements 111A-111D may serve as gateway servers or edge routers to interconnect the core network 110 with other networks 140, Internet 130, wireless access network 150, access network 120, and so forth. As shown in FIG. 1, core network 110 may also include a media server (MS) 112, a plurality of content servers 113, a plurality of application servers 114, an advertising server 117, and an application server 115 with associated database 116. For ease of illustration, various additional elements of core network 110 are omitted from FIG. 1.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services.

Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc.

Application servers 114 may also include an IMS media server (MS) for handling and terminating media streams to provide services such as announcements, bridges, and Interactive Voice Response (IVR) messages for VoIP and cellular service applications. The MS may also interact with customers for media session management.

In addition, application servers 114 may also include a presence server, e.g., for detecting a presence of a user. For example, the presence server may determine the physical location of a user or whether the user is "present" for the purpose of a subscribed service, e.g., online for a chatting service and the like.

Application servers 114 may include business information database (BID) storage servers. For instance, the network operator of core network 110 may receive and store third-party information relating to subscribers.

Application servers 114 may also include subscriber profile/usage databases storing information regarding the interests and characteristics of various subscribers. For example, a user may explicitly indicate his or her interest in various types of subjects and products, e.g., by completing a survey provided by the network service provider.

In another example, the network service provider of core network 110 may infer users' interests based upon user activities across various network services. For example, a user's interests can be inferred from the types of websites visited, the types of products searched for and purchased online, the programs the user has watched on television, the places the user has visited and/or events the user has attended (e.g., based upon tracking mobile device locations), and so forth. It should be noted that the foregoing are only several examples of the types of relevant application servers 114 that may be included in core network 110 for storing information relevant to providing personalized content to a subscriber.

With respect to television service provider functions, core network 110 may include one or more television servers 112 for the delivery of television content, e.g., a broadcast server, a cable head-end, a video-on-demand (VoD) server, and so forth. For example, core network 110 may comprise a video super hub office, a video hub office and/or a service office/central office. In this regard, television servers 112 may interact with content servers 113, advertising server 117 and application server 115 to select which content to provide to the home network 160 and others.

In one example, content servers 113 may store scheduled national television broadcast content for a number of television channels, video-on-demand programming, local programming content, and so forth. For example, content providers may upload various contents to the core network to be distributed to various subscribers.

In one example, advertising server 117 stores a number of advertisements that can be selected for presentation to viewers, e.g., in the home network 160 and at other downstream viewing locations. For example, advertisers may upload various advertising content to the core network to be distributed to various viewers.

In accordance with the present disclosure, the selection of advertising content (e.g., commercials and the like) from the advertising server 117 and/or or other program content (e.g., movies, videos, sports events and the like) from content server(s) 113 may be controlled by an application server 115. The application server (AS) 115 may comprise any server or computer that is known in the art, and the database 116 may be any type of electronic collection of data that is also known in the art. Among other things, application server 115 may select personalized content for presentation to a viewer based upon diverse information associated with the viewer and his or her specified or deduced preferences, interests, viewing and purchase histories, etc., that are stored in various application servers 114 or within application server 115.

Application server 115 may perform operations for presenting a personalized content to a viewer at a display, in accordance with the exemplary method 200 described below. As such, database 116 may store information in support of such functions, e.g., including data matching a current viewer to a particular television/display, advertising schedules that are personalized for different viewers, and so forth. It should be noted that the foregoing are only several examples of the types of information and data that may be used in conjunction with the devices, networks and methods described herein for presenting a personalized content to a viewer at a display. As such, the present disclosure is not limited to only the above examples. Further details regarding the functions that may be implemented by application server 115 are discussed in greater detail below in connection with the exemplary method 200.

In addition, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another embodiment node 122 may be omitted, e.g., for fiber-to-the-premises (FTTP) installations. Access network 120 may also transmit and receive communications between home network 160 and core network 110 relating to voice telephone calls, communications with web servers via the Internet 130 and/or other networks 140, and so forth.

In one example, home network 160 may include a home gateway 161, which receives data associated with different types of media, e.g., television, phone, and Internet, and separates these communications for the appropriate devices. For instance, television data is forwarded to set-top boxes (STBs) 162A, and 162B to be decoded and forwarded to televisions 163A, and 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV.

Notably, the television programming that is watched and/or requested by viewers in home network 160, the Internet communications of users in the home network, and so forth may be monitored and logged either by components within home network 160, components of core network 110 or even components of other networks 140. Broadly, such information may be referred to as television usage information, Internet usage information or simply usage information. For example, if a user of home PC 166 requests a particular webpage from a web server via Internet 130, the request may be logged by home gateway 161, by application server 115, by one of the application servers 114, and so forth. In some instances, home gateway 161, application server 115, and other devices may forward usage information to one or more of application servers 114 for inclusion in profile/usage database(s) storing information regarding the interests and characteristics of various subscribers.

In addition, embodiments of the present disclosure may monitor and track usage of subscribers while away from the home. For instance, if an individual is a subscriber associated with home network 160 and is also a subscriber associated with mobile device 157B, then Internet usage by the subscriber at mobile device 157B may be tracked and aggregated with usage information relating to the subscriber gathered from usage at PC 166 in home network 160.

In general, television and Internet usage information may be used in accordance with the present disclosure to build a viewer profile with respect to each viewer of television programming from core network 110. In one example, viewer profiles are stored in one of application servers 114. In addition, in one example, viewer profile information is also aggregated with additional information, such as credit reports, and other third-party information regarding viewers/subscribers (which may be similarly stored in the same or a different one of application servers 114). In various embodiments, application servers 114 may also store biometric information of subscribers, subscriber calendar information and/or other presence information of subscribers, as described in greater detail below.

In addition, those skilled in the art will realize that the network 100 may be implemented in a different form than that illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
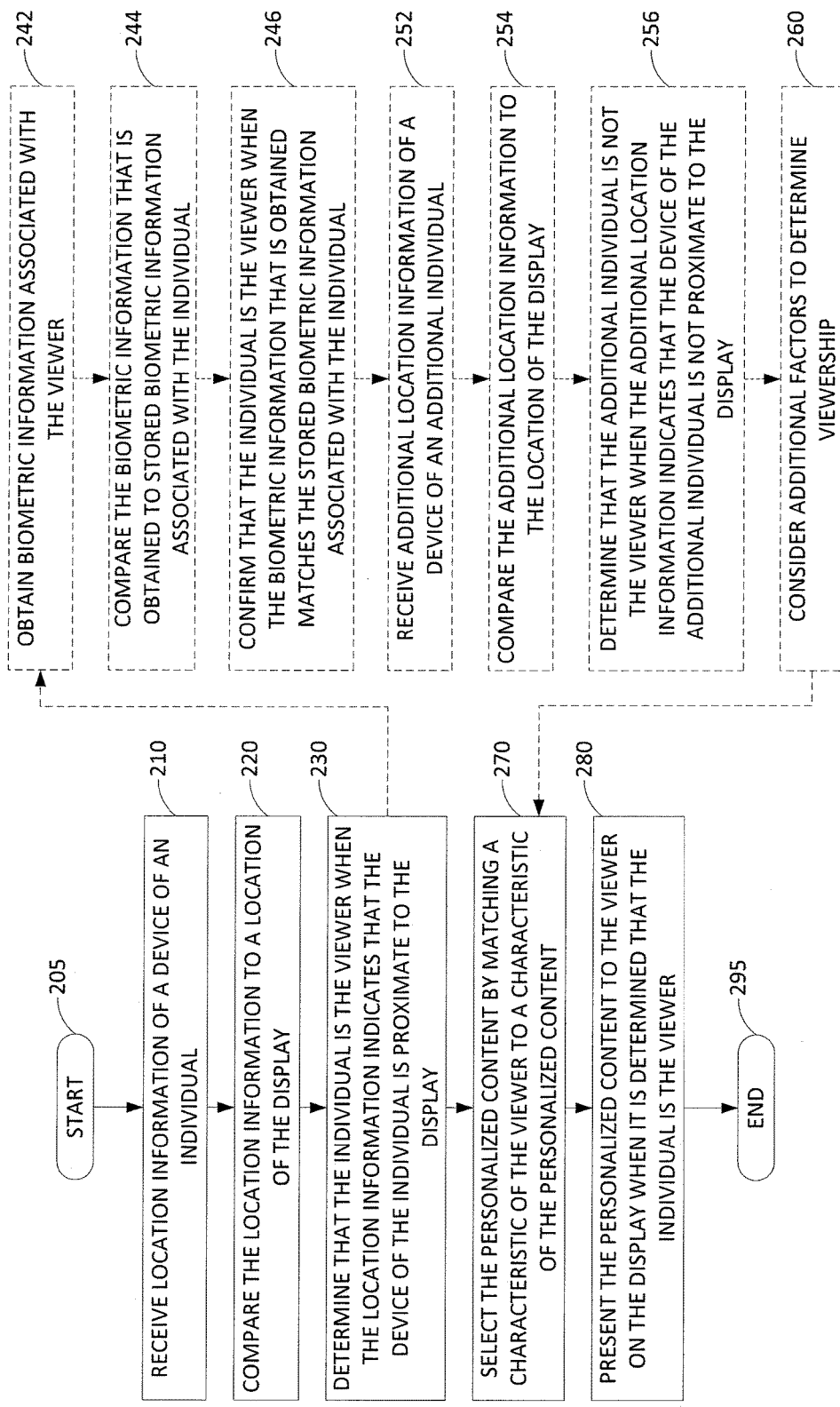
FIG. 2 illustrates a flowchart of a method for synchronizing a mobile device to a display, according to the present disclosure.

FIG. 2 illustrates a flowchart of a method 200 for presenting a personalized content to a viewer at a display. In one embodiment, the method 200 is performed by the application server 115, any one or more components thereof (e.g., a processor performing operations stored in and loaded from a memory), or any one or more other devices in a communication network, such as communication network 100 of FIG. 1. For illustrative purposes, aspects of the method 200 may also be considered with reference to various components illustrated in FIG. 1. Alternatively, or in addition, one or more operations of the method 200 may be implemented by a general purpose computer having a processor, a memory and input/output devices as illustrated below in FIG. 3, or by any component thereof, e.g., by the processor 302.

Method 200 starts in step 205 and proceeds to step 210. In step 210, the method 200 receives location information of a device of an individual. For example, a household may have one or more subscriptions for one or more mobile devices, e.g., for cellular telephony and data services from a telecommunication network provider. Each of the mobile devices may be associated with a different one of the members of the household. For instance, in FIG. 1, mobile device 167A may belong to a first adult of the household, mobile device 157A may belong to a second adult of the household, mobile device 167B may belong to a first child, mobile device 157B may belong to a second child, and so forth. In addition, the household may have one or more subscriptions for a home television service, a home telephone service and/or a home Internet (broadly a data service) service (e.g., "double-play" services, "triple-play" services, or "a la carte" services). For instance, home network 160 in FIG. 1 may comprise the home network for such a household, with the devices shown in FIG. 1 included therein. The service provider for home network 160 may be the same or a different service provider as a cellular service provider. For example, the core network 110 in FIG. 1 may provide cellular services via wireless access network 150, in addition to home telephony, television and Internet services.

In any case, at step 210, the method obtains the location information of a device of an individual. In this example, it is assumed that the first adult associated with mobile device 167A is at home and is a viewer of a display, e.g., television 163A. It is also assumed that the first child associated with mobile device 167B is also currently at home, while the second adult associated with mobile device 157A is at work and away from the home and the second child associated with mobile device 157B is at school and also away from home.

Accordingly, the locations of mobile devices 157A, and 157B may be determined by global positioning system (GPS) location information gathered by the devices themselves, or may be inferred by determining the respective serving base station, e.g., NodeB 152 and/or NodeB 153. Similarly, the locations of mobile devices 167A, and 167B may be determined by GPS location information, serving cellular base station information (which may also be referred to herein as "cellular network location information"), or based upon a connection to a home network 160. For instance, mobile devices 167A, and 167B may be connected to core network 110 via access network 120, and via home gateway 161 and router 165 in home network 160.

At step 220, the method 200 compares the location information of a mobile device to a location of a display. For example, one purpose of the present method 200 is to determine which one or more of a plurality of individuals (e.g., members of a household or visitors to a particular home) is a current television viewer. For instance, TV 163A may have recently been turned on or may be in use, but an identity of a current viewer, or viewers, is unknown. Accordingly, the method 200 may attempt to determine the identities of possible viewers based upon location information of mobile devices associated with different individuals. Where multiple different individuals are determined to be possible viewers, the method 200 may make certain assumptions to decide between two or more candidate viewers, as described in greater detail below.

To illustrate, the location of TV 163A may be known to the method 200 in a number of ways. For example, a physical location of the TV 163A and/or the associated STB 162A may be recorded at a time of installation by the service provider. The location of home network 160 may also be recorded based upon a physical address and/or a street address, such that the location of TV 163A can be accurately assumed to be within the home. The approximate location of home network 160 and its components, including TV 163A, may also be determined based upon the location of access network 120 and/or node 122 to which home gateway 161 is connected.

Assuming that mobile device 167A is under consideration, at step 220 the method 200 may determine that mobile device 167A is proximate (e.g., within a predefined distance from the display, e.g., within 10 feet of the display, within 20 feet of the display, within 10 feet of the display and facing the display, and so on) based upon the location information of the mobile device 167A and the location information of TV 163A. For instance, the method 200 may determine that mobile device 167A is currently in the same home network as TV 163A. In one example, TV 163A may be a smart TV, where mobile device 167A and TV 163A are assigned local IP addresses by the router 165 and/or home gateway 161. In another example, the method 200 may determine that STB 162A (serving TV 163A) and mobile device 167A are currently connected to the home network 160. Another mechanism that can assist in the correlation is whether the various devices are currently communicating with each other, e.g., whether a smart phone is currently being used to change channels on a set top box, or to access a data service via the set top box and the like. This will indicate that the user of that particular smart phone is watching one of the televisions.

Alternatively, or in addition, the method 200 may determine that the mobile device 167A is within a threshold range of the location of TV 163A, e.g., based upon a comparison of GPS or service cellular base station information of mobile device 167A with a street address and/or physical coordinates of the home network 160. In one example, serving base station information for a mobile device is determined by consulting a HSS/HLR, e.g., one of the application servers 114 in FIG. 1. Similarly, the method 200 accesses stored location information for TV 163A, STB 162A and any other components connected to home network 160 via one of the application servers 114 in core network 110 of FIG. 1, e.g., a customer account and billing server, or the like. Thus, in one example if the GPS location information of mobile device 167A is within 200 feet, 300 feet or some other threshold distance of a stored location associated with home network 160, then the method may determine the mobile device(s) is proximate to the TV 163A. In another example, if the serving cellular base station information indicates that mobile device 167A is being serviced by the nearest cellular base station to home network 160, or the home serving cellular base station for the location of home network 160, then the method 200 may determine that mobile device 167A is proximate to TV 163A.

At step 230, the method 200 determines that an individual associated with a mobile device is a viewer when the location information of the device of the individual indicates that the device of the individual is proximate to the display. In particular, step 230 may comprise a decision based upon the comparison at step 220. Continuing with the present example, at step 230 the method 200 may conclude that the first adult of the household associated with mobile device 167A is the viewer insofar as the location information of mobile device 167A indicates that the mobile device 167A is proximate to the TV 163A.

Following step 230, the method 200 proceeds to step 270, or proceeds to optional step 242. At optional step 242, the method 200 obtains biometric information associated with the viewer. In particular, the decision at step 230 regarding an identification of the viewer may be ambiguous or inaccurate. For instance, location information of mobile device 167B may indicate that mobile device 167B is also proximate to TV 163A. For instance, mobile device 167B may also be serviced by the nearest cellular base station to home network 160, may have GPS location information that indicates mobile device 167B's proximity to home network 160 and/or TV 163A, mobile device 167B may also have a current connection to router 165, and so forth. Accordingly, based upon location information alone, it may be equally likely that the first child associated with mobile device 167B is a viewer. Accordingly, optional steps 242-246 relate to one sub-routine for resolving such an ambiguity.

In particular, step 242 may comprise obtaining silhouette information, facial image information, voice information, fingerprint information or other biometric information of the viewer. For example, the TV 163A may have an attached or integrated camera for obtaining silhouette or facial image data of a viewer, or an attached or integrated microphone for recording voice(s) within recording range of the microphone. Similarly, a remote control, for example, may have a fingerprint sensor for obtaining fingerprint information of the viewer, and so forth. In any case, the biometric information may be forwarded, e.g., to application server 115 or other network device such that the method 200 may receive such biometric information at step 242.

Consequently, optional step 244 may comprise comparing the biometric information that is obtained at step 242 with stored biometric information. For instance, one of application servers 114 may store separately, or in conjunction with subscriber/user profiles, biometric information relating to a plurality of subscribers/users. Accordingly, the method 200 may retrieve such stored biometric information at step 244 for comparison.

At optional step 246, when the biometric information that is obtained at step 242 matches the stored biometric information associated with the individual, the method 200 may confirm that the individual is the viewer. In the present example, if the biometric information obtained (at step 242) is determined (at step 244) to match biometric information of the first adult associated with mobile device 167A, then the method 200 may confirm (at step 246) that the first adult is the viewer. Conversely, if the biometric information does not match that of the first adult, then the method 200 may conclude that the determination at step 230 is incorrect. For example, the first adult may be at work and may have accidentally left his or her mobile device 167A at home. Similarly, the first child associated with mobile device 167B may be the actual viewer, while the first adult's mobile device 167A is physically located at home but the first adult is not the individual who is watching TV 163A.

In this regard, optional steps 252-256 may be performed in the method 200 as a further or different sub-routine to resolve such ambiguities. Accordingly, following optional step 246 the method 200 may proceed to optional step 252.

At optional step 252, the method 200 receives additional location information of a device of an additional individual. For instance, the method 200 may receive location information regarding mobile device 157A associated with the second adult of the household.

At optional step 254, the method 200 compares the additional location information to the location of the display, e.g., TV 163A. For example, step 254 may comprise operations that are the same or substantially similar to those described above in connection with step 220.

At optional step 256, the method 200 determines that the additional individual (e.g., the second adult) is not the viewer when the additional location information indicates the device of the additional individual (e.g., mobile device 157A) is not proximate to the display (e.g., TV 163A). For instance, the location information may indicate that mobile device 157A is serviced by a cellular base station (e.g., NodeB 152) near the second adult's place of work that is different from the cellular base station closest to the home network 160.

It should be noted that the foregoing is just one example illustrating one possible outcome where the method 200 includes steps 252-256. As another example, steps 252-256 may consider mobile device 167B of the first child of the household. Notably, serving cellular base station information of mobile device 167B may indicate that mobile device 167B is also proximate to TV 163A and/or home network 160. In one example, the location information of mobile device 167B may also include information that mobile device 167B has a connection to router 165. As such, the method 200 may reach a negative determination at step 256. In other words, the method 200 cannot exclude that the first child associated with mobile device 167B may also be a viewer.

However, in another example, location information of mobile device 167B may indicate that it is served by the base station closest to the home network 160, but that there is no current connection to router 165. In this case, considering the different types of location information, the method 200 may conclude that while mobile device 167B is in the neighborhood of the home network 160, it is not currently located in the house or proximate to the TV 163A/home network 160. For instance, the first child may be playing with a friend down the street. Accordingly, in this example, at step 256, the method 200 may determine that the first child associated with mobile device 167B is not the viewer. Thus, the location information of all the family members of a household can be used to resolve any viewership identity issue.

It should be noted that in an additional embodiment, still further information may be used to resolve ambiguities in determining viewership. Thus, following step 256, the method 200 may proceed to step 270 or to optional step 260.

At optional step 260, the method 200 may consider additional factors to determine viewership. For instance, if the method 200 concludes that the first adult is the viewer, but cannot exclude that the first child may also be the viewer, or that the first child is an additional viewer, then the method 200 may consider further parameters for either the first adult and/or his or her mobile device 167A, or the first child and/or his or her mobile device 167B. For instance, the method 200 may consider whether the current programming is children's programming or non-children's programming. If the programming is children's programming, the method 200 may be configured to conclude that the viewer is the first child, as opposed to the first adult. Alternatively, or in addition, the method 200 may also be configured to determine that both the first adult and the first child are viewers, e.g., they are watching the programming together. Likewise, it is possible that there are two displays simultaneously in use, e.g., TV 163A and TV 163B in home network 160. Accordingly, the method 200 may consider the type of programming that is on TV 163A as compared to TV 163B to determine which individual is a viewer of which TV. For instance, children's programming may be selected on TV 163B located in a family room, while the news is selected on TV 163A in a nearby kitchen. Thus, the method 200 may conclude that the first child is the viewer of TV 163B with the children's programming, while the first adult is the viewer of TV 163A with the news.

In still another example, at optional step 260 the method 200 may consider calendar information of an individual associated with a mobile device. For instance, if the calendar information indicates that the individual has a scheduled event at the current time, e.g., a phone call, a work event, or some other event away from the home, then the method 200 may determine that the individual is not the viewer, or is less likely to be the viewer. In one example, the calendar information may be stored in and/or retrieved from one of application servers 114 in FIG. 1. For example, the network service provider/operator of core network 110 may provide a cloud-based calendar, or such a calendar may be provided by a third-party to which the method 200 is provided access.

In a further example, at optional step 260, the method 200 may consider whether the mobile device is currently in use, e.g., on a phone call. For example, if the mobile device is engaged in a voice call for more than a threshold duration, e.g., longer than two minutes, longer than five minutes, etc., then the method 200 may determine that the individual is not the viewer, or is less likely to be the viewer who is being attentive to the displayed programming. Notably, in this case it is possible that the individual is the one who turned on the display. However, the present embodiment may assume that he or she is not likely to be paying attention to the content on the TV. Thus, the method 200 may consider it wasteful to provide personalized content at such time. Similarly, at step 260 the method 200 may consider that the individual is not the viewer, or is less likely to be the viewer, when it is determined that the mobile device associated with the individual is in motion, e.g., moving greater than a threshold speed. For instance, if the individual is riding in a motor vehicle or operating a lawn mower, it is unlikely that he or she is the viewer of TV 163A in home network 160.

As yet another example, at optional step 260, the method 200 may consider historical location information of a mobile device associated with an individual. For example, the historical location information of a mobile device may be tracked and stored in one of application servers 114 in FIG. 1. Accordingly, the method 200 may access this information at step 260 and determine the likelihood that the individual associated with the mobile device is a viewer based upon this additional data. For instance, if the historical location information indicates that the individual/mobile device is not typically near the home network during weekdays at 9 am to 5 pm, the method 200 may determine that the individual is not the viewer, or is less likely to be the viewer during these hours. Similarly, the method 200 may consider additional current presence information at optional step 260. For example, if the individual is known to be logged-in to a network other than home network 160 (e.g., logged in on a work computer), or the mobile device is connected to core network 110 via a network other than home network 160, the method 200 may determine that the individual is not the viewer, or is less likely to be the viewer who will be attentive to the displayed programming.

It should also be noted that the various parameters described in connection with the above steps or operations of the method 200 may be considered in conjunction with one another in order to make a determination as to viewership. Thus, for example, with respect to one or more individuals under consideration, the method 200 may simultaneously consider cellular network location information, GPS location information, information on a current wireless fidelity (Wi-Fi) connection, biometric information, calendar information, historical location information, information on other individuals and their devices, and so forth in order to determine whether the individual is a viewer or not. As such, each of the parameters may comprise a weighted factor contributing to such a decision, where the weightings may be pre-selected for use in the method 200, or where the weightings are adjusted based upon machine learning and feedback as to the accuracy of past viewership predictions. In any case, following optional step 260, the method 200 proceeds to step 270.

At step 270, the method 200 selects personalized content for presentation to the viewer by matching a characteristic of the viewer to a characteristic of the personalized content. For example, once the method 200 concludes that an individual is the viewer, the method 200 may retrieve profile information of the viewer, e.g., from one or more of application servers 114. In one example, a characteristic of the viewer may comprise interests of the viewer, which may be represented, for example, by one or more keywords. Similarly, content that may be selected at step 270 may also be represented by one or more keywords corresponding to one or more topics of the content. For example, content relating to a sports contract for a famous player may be represented by keywords such as the player's name, the team name, the name of the sport, the name of the city of the team, and so forth. Thus, if the profile of the viewer indicates that he or she is interested in one or more of the sports, the team, the particular player, the city, etc., the content may be matched to the profile of the viewer base upon such similarities.

In one embodiment, the content comprises television programming that may be retrieved from content server(s) 113. In another embodiment, the content comprises advertising content that may be retrieved from advertising server 117 and matched to the viewer based upon characteristics of the viewer and characteristics of the advertising content. In one embodiment, characteristics of available content may be stored along with the content in servers 113 and 117. For example, at step 270 the method 200 may access business information database (BID) storage servers with third-party information relating to subscribers, subscriber profile/usage databases storing information regarding the characteristics of various subscribers, e.g., obtained from a survey provided by the network service provider and/or inferred based upon user activities across various network services, and so forth. In this regard, the characteristics of the viewer may broadly include interests and demographic information such as the viewer's age, gender, income, purchase history, viewing history, e.g., both for television and Internet, and so on.

As mentioned above, in some instances it may be determined that there is more than one viewer. Accordingly, step 270 may comprise matching content to an aggregate profile based upon a combined set of characteristics for the viewers. In one example, where the viewership includes children, the possible content that may be selected is restricted to age appropriate content, e.g., no advertisements for alcohol, or R rated movie trailers, and so on.

At step 280, the method 200 presents the personalized content that is selected at step 270 to the viewer(s) on the display. For example, content may be retrieved from an appropriate server (e.g., 113 and/or 117) and provided to television 163A via distribution from one or more of TV servers 112, e.g., via a VoD server. In one example, the content selected at step 270 and presented at step 280 may comprise an interactive media/interactive advertisement. For example, the viewer may be presented with an opportunity to obtain further information about an advertised product, e.g., by linking to a webpage relating to the product, or may be presented with an opportunity to make an immediate purchase. For instance, the viewer of TV 163A (e.g., the first adult associated with mobile device 167A) may make selections with a remote control to indicate a desire to purchase the advertised product. In turn, the STB 162A may receive and communicate these selections to core network 110 via home gateway 161, access network 120, etc. In one embodiment, where the viewership includes children, the ability to interact with advertising content is restricted, e.g., such that a password must be entered in order to continue to make a purchase.

Following step 280, the method 200 proceeds to step 295 where the method ends.

It should be noted that the above described method 200 is one just one exemplary embodiment of the present disclosure. Thus, those skilled in the art will appreciate that variations of the above described method 200 may readily be devised within the scope of the present disclosure. For example, although the method 200 is described above as being performed by an application server, in various other embodiments, steps or operations of the method 200 may be performed by a plurality of cooperating application servers, or may be assigned by a single application server or one or more of such cooperating application servers to one or more other devices for completion. For instance, the comparison of biometric information at step 244 may be assigned to a separate device to return the result of the comparison, the comparison of location information at steps 220 and/or 254 may be assigned to a separate device, and so forth.

As still another example, the method 200 is primarily described above in connection with a process to determine which household member(s) are viewers of a display within the home network 160 of FIG. 1. However, in another example the method 200 may be expanded to determine whether a guest or visitor to the home of home network 160 may also be a viewer (and to present personalized content accordingly). Notably, the present method 200 may readily discern that a device of a guest in the home is also proximate to the display by performing the same steps 210-230 and optionally steps 242-246 and steps 252-256 with respect to the device of the guest. In fact, the method 200 may continuously be performed with respect to any mobile device of any subscriber/user in order to determine whether the user is a viewer at virtually any display for which television service is provided by the network service provider (e.g., the operator of core network 110). For instance, the method 200 may access a large database of location information of television displays serviced by the network and may determine which display(s), if any, are proximate to the mobile device of a user. In this manner, personalized content can be provided to the user at any serviced display at which the user is a viewer. Moreover, the present disclosure is not limited to determining viewership in a "home network". Rather, embodiments of the present disclosure may broadly be applied to business networks, public networks, home/residential networks and so forth having TVs/displays that are serviced by a network provider.

In addition, although not expressly specified above, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 3:
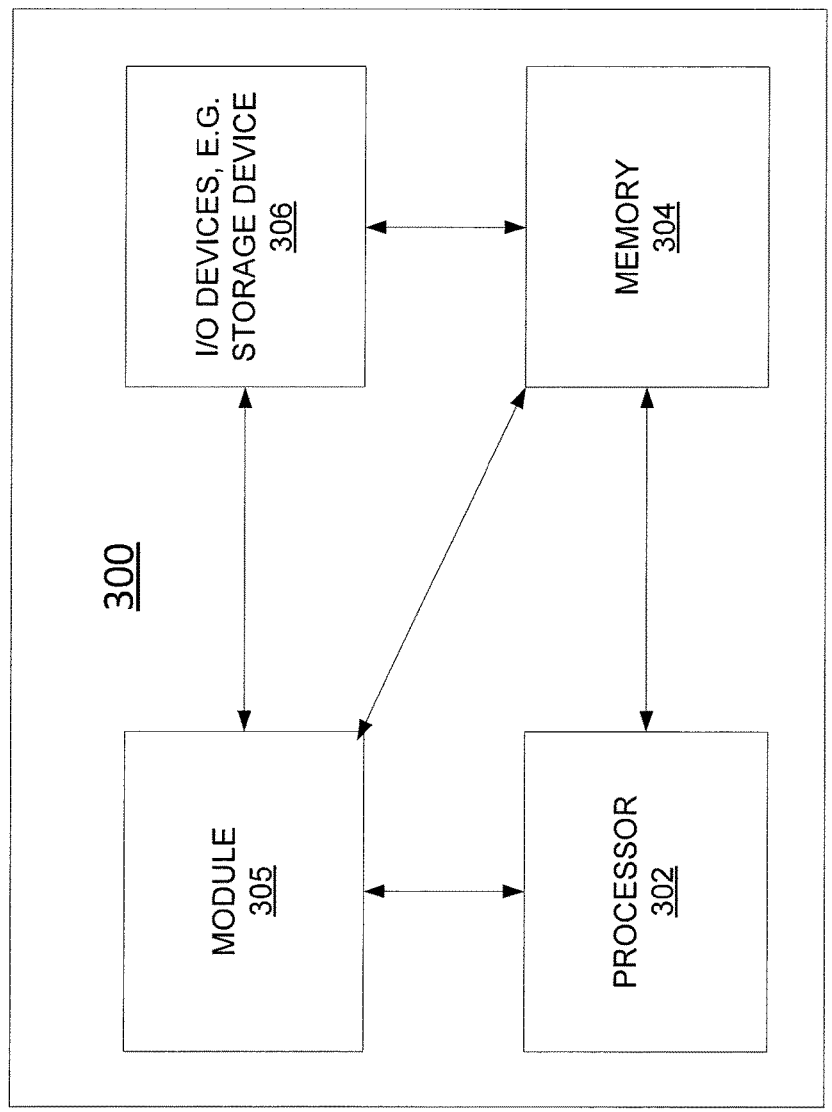
FIG. 3 illustrates a high level block diagram of a general purpose computer suitable for use in performing the functions described herein.

FIG. 3 depicts a high-level block diagram of a general-purpose computer or system suitable for use in performing the functions described herein. For example, any one or more components or devices illustrated in FIG. 1 or described in connection with the method 200 may be implemented as the system 300. As depicted in FIG. 3, the system 300 comprises a hardware processor element 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for presenting a personalized content to a viewer at a display, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 305 for presenting a personalized content to a viewer at a display (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for presenting a personalized content to a viewer at a display (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for presenting a personalized content to a viewer at a display, the method comprising:
  receiving, by a processor, location information of a device of an individual, wherein the display is distinct from the device;
  comparing, by the processor, the location information to a location of the display;
  determining, by the processor, that the individual is the viewer when the location information indicates that the device of the individual is proximate to the display, wherein the determining that the individual is the viewer further comprises:
    obtaining biometric information associated with the viewer, wherein the biometric information comprises voice information and silhouette information;
    comparing the biometric information that is obtained to stored biometric information associated with the individual; and
    confirming that the individual is the viewer when the biometric information that is obtained matches the stored biometric information associated with the individual;
  presenting, by the processor, the personalized content on the display when the individual is determined to be the viewer;
  receiving, by the processor, additional location information and device usage information of a device of an additional individual, wherein the device usage information indicates whether the device of the additional individual is being used for a voice call;
  comparing, by the processor, the additional location information to the location of the display; and
  determining, by the processor, that the additional individual is not the viewer when the additional location information indicates that the device of the additional individual is proximate to the display and the device of the additional individual is currently being used for the voice call.

2. The method of claim 1, wherein the processor comprises a processor of an application server deployed in a television distribution network.

3. The method of claim 1, wherein the biometric information further comprises, at least one of:
  facial image information; and
  fingerprint information.

4. The method of claim 1, wherein the obtaining, the comparing and the confirming are performed for each individual when there is more than one individual proximate to the display.

5. The method of claim 1, wherein the location information comprises:
global positioning system information associated with the device of the individual.

6. The method of claim 1, wherein the location information comprises cellular network location information associated with the device of the individual.

7. The method of claim 1, wherein the location information comprises historical location information associated with the individual.

8. The method of claim 1, wherein the additional location information further comprises:
global positioning system information associated with the device of the additional individual.

9. The method of claim 1, wherein the additional location information further comprises:
cellular network location information associated with the device of the additional individual.

10. The method of claim 1, wherein the presence information associated with the additional individual further comprises:
login information associated with the additional individual.

11. The method of claim 1, wherein the presenting the personalized content on the display comprises:
delivering the personalized content to the display.

12. The method of claim 1, wherein the personalized content comprises an advertising content.

13. The method of claim 12, wherein the advertising content comprises an interactive media.

14. The method of claim 1, further comprising:
selecting the personalized content by matching a characteristic of the viewer to a characteristic of the personalized content.

15. A non-transitory computer-readable medium storing a plurality of instructions which, when executed by a processor, cause the processor to perform operations for presenting a personalized content to a viewer at a display, the operations comprising:
receiving location information of a device of an individual, wherein the display is distinct from the device;
comparing the location information to a location of the display;
determining that the individual is the viewer when the location information indicates that the device of the individual is proximate to the display, wherein the determining that the individual is the viewer further comprises:
obtaining biometric information associated with the viewer, wherein the biometric information comprises voice information and silhouette information;
comparing the biometric information that is obtained to stored biometric information associated with the individual; and
confirming that the individual is the viewer when the biometric information that is obtained matches the stored biometric information associated with the individual;
presenting the personalized content on the display when the individual is determined to be the viewer;
receiving additional location information and device usage information of a device of an additional individual, wherein the device usage information indicates whether the device of the additional individual is being used for a voice call;
comparing the additional location information to the location of the display; and
determining that the additional individual is not the viewer when the additional location information indicates that the device of the additional individual is proximate to the display and the device of the additional individual is currently being used for the voice call.

16. An apparatus for presenting a personalized content to a viewer at a display, the apparatus comprising:
a processor; and
a computer-readable medium storing a plurality of instructions which, when executed by the processor, cause the processor to perform operations comprising:
receiving location information of a device of an individual, wherein the display is distinct from the device;
comparing the location information to a location of the display;
determining that the individual is the viewer when the location information indicates that the device of the individual is proximate to the display, wherein the determining that the individual is the viewer further comprises:
obtaining biometric information associated with the viewer, wherein the biometric information comprises voice information and silhouette information;
comparing the biometric information that is obtained to stored biometric information associated with the individual; and
confirming that the individual is the viewer when the biometric information that is obtained matches the stored biometric information associated with the individual;
presenting the personalized content on the display when the individual is determined to be the viewer;
receiving additional location information and device usage information of a device of an additional individual, wherein the device usage information indicates whether the device of the additional individual is being used for a voice call;
comparing the additional location information to the location of the display; and
determining that the additional individual is not the viewer when the additional location information indicates that the device of the additional individual is proximate to the display and the device of the additional individual is currently being used for the voice call.

17. The apparatus of claim 16, wherein the obtaining, the comparing and the confirming are performed for each individual when there is more than one individual proximate to the display.

* * * * *